United States Patent [19]
Dickinson

[11] Patent Number: 5,328,141
[45] Date of Patent: Jul. 12, 1994

[54] SAG COMPENSATED VIBRATION ISOLATION MOUNT

[75] Inventor: Stuart C. Dickinson, Bristol, R.I.

[73] Assignee: The United States of America as represented by the Secretary of the Navy, Washington, D.C.

[21] Appl. No.: 100,798

[22] Filed: Aug. 2, 1993

[51] Int. Cl.⁵ .......................................... F16M 13/00
[52] U.S. Cl. .................................. 248/550; 248/632; 248/634; 267/141
[58] Field of Search ............... 248/550, 638, 632, 634; 267/140, 141, 141.1, 141.2; 180/300

[56] References Cited

U.S. PATENT DOCUMENTS

| | | | |
|---|---|---|---|
| 3,625,501 | 12/1971 | Hein | 267/141 X |
| 4,006,505 | 2/1977 | Koster | 267/141 X |
| 4,006,892 | 2/1977 | Koeneman | 267/141 X |
| 4,195,826 | 4/1980 | Weinke | 267/141 X |
| 4,491,304 | 1/1985 | Kakimoto | 267/141.2 X |
| 4,765,600 | 8/1988 | Hartel | 267/141.1 X |
| 4,790,521 | 12/1988 | Ide | 180/300 X |
| 4,817,921 | 4/1989 | Stevenson | 248/634 X |
| 4,828,234 | 5/1989 | Hoying | 248/550 X |
| 4,844,430 | 7/1989 | Miya | 267/141.2 X |
| 5,249,784 | 10/1993 | Murakami | 267/140.14 X |

FOREIGN PATENT DOCUMENTS 628896 11/1961 Italy ..................................... 267/141

*Primary Examiner*—J. Franklin Foss
*Attorney, Agent, or Firm*—Michael J. McGowan; Prithvi C. Lall; Michael F. Oglo

[57] ABSTRACT

A sag-compensated vibration isolation mount includes a cylindrical rubber body element and a circular band extending around the body element. The band is formed from a shape-memory alloy metal which has a predetermined transition temperature. The band is operative for restricting outward bulging and sagging of the body element when the body element is subjected to an axial load at a temperature above the transition temperature. The band has a first length at a temperature above the transition temperature and it is stretchable to a second length at a temperature below the transition temperature. At temperatures below the transition temperature, the body element normally stretches the band to its second length. However, when the band is heated above its transition temperature, the band rapidly decreases in length to its first length to forcibly compress the body element and restrict outward bulging of the body element.

16 Claims, 1 Drawing Sheet

SAG COMPENSATED VIBRATION ISOLATION MOUNT

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1) Field of the Invention

The instant invention relates to a vibration isolation mount and more particularly to a vibration isolation mount which automatically compensates for sag at elevated temperatures.

(2) Description of the Prior Art

Vibration isolation mounts have heretofore been known for isolating devices, such as motors, from their surrounding environments. More specifically, the function of a vibration isolation mount is either to prevent vibratory motion of a device from propagating into its surroundings, such as in isolating a machine from its motor, or to prevent vibratory motion of a surrounding environment from travelling to a delicate device, such as in seismic isolation, or isolation from vibrations encountered in shipping and handling.

The primary element of a vibration isolation mount is a visco-elastic body element, such as a rubber cylinder, which is effective for absorbing or dissipating vibratory energy. While rubber is known to be an effective material for absorbing vibratory energy, it is also known that the mechanical properties of rubber change as a function of temperature. More specifically, it is known that the shear modulus (elastic strength) of rubber decreases as temperature increases, and that a reduction in the shear modulus of rubber causes the rubber to become more elastic or resilient.

In this regard, a rubber isolation mount which is subjected to a compressive force at an elevated temperature tends to bulge outwardly and sag in the direction of the applied mean force. This sagging phenomenon presents a particular problem when a rubber vibration isolation mount is used to isolate a rotary electric motor in a shaft operated machine. In a shaft operated machine, a rotary electric motor is typically mounted on a cylindrical vibration isolation mount, and the drive shaft of the motor is coupled to a drive shaft of the machine. The electric motor generates heat as a product of its operation, and in an enclosed space, such as a machine housing, the heat generated by the motor causes a localized increase in temperature around the motor. The increased temperature causes the rubber isolation mount to bulge outwardly and sag under the weight of the motor. The sagging of the isolation mount decreases the vertical height of the motor drive shaft and causes it to become misaligned with the machine drive shaft. Misalignment of the drive shafts provides an additional source of vibration which can cause to the motor and to the machine itself. Current design techniques attempt to solve this shaft alignment problem with special shaft couplings which allow for movement of the motor drive shaft with respect to the machine drive shaft.

SUMMARY OF THE INVENTION

The instant invention provides a vibration isolation mount which compensates for sag at elevated temperatures.

Briefly, the sag-compensated vibration isolation mount of the instant invention comprises a cylindrical rubber body element and a circular band extending around the body element. The band is formed from a shape-memory alloy which has a predetermined transition temperature, and it is operative for restricting bulging and sagging of the rubber body element at a temperature above its transition temperature. The shape-memory alloy band has a first length at a temperature above its transition temperature, and it is stretchable to a second length at a temperature below its transition temperature. The second stretched length of the band is substantially equal to the circumference of the body element, and at a temperature below the transition temperature, the resilient body element normally stretches the band to its second length. However, when the temperature rises above the transition temperature, the shape-memory alloy band automatically decreases in length to its first length. The decrease in length causes the band to radially compress or squeeze the cylindrical body element, thereby restricting outward bulging or sagging of the body element.

BRIEF DESCRIPTION OF THE DRAWINGS

A more complete understanding of the invention and many of the attendant advantages thereto will be readily appreciated as the same becomes better understood by reference to the detailed description when considered in conjunction with the accompanying drawings wherein.

DESCRIPTION OF THE PREFERRED EMBODIMENTS

Figure 1:
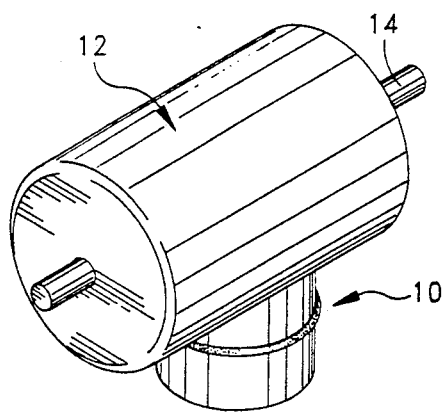
FIG. 1 is a perspective view of a first embodiment of the sag-compensated vibration isolation mount of the instant invention with a rotary electric motor mounted thereon.

Referring now to the drawings, a first embodiment of the sag-compensated vibration isolation mount of the instant invention is illustrated and indicated at 10 in FIGS. 1 through 4. The vibration isolation mount 10 of the instant invention is operative for supporting a rotary electric motor generally indicated at 12 in a shaft operated machine. The instant invention effectively compensates for outward bulging and sagging of the mount 10 at elevated temperatures and thereby maintains the electric motor 12 at a constant height.

The rotary electric motor 12 is conventional in the electrical arts, and it includes a rotatable drive shaft 14 which is coupled to a drive shaft 16 of the machine by conventional coupling means 15. The motor 12 has a mass M which exerts a compressive load Mg (mass X gravity) downwardly onto the vibration isolation mount 10.

Figure 2:
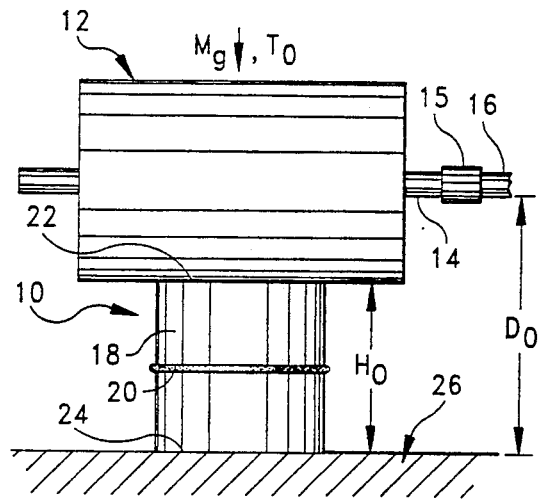
FIG. 2 is a side elevational view thereof.
Figure 3:
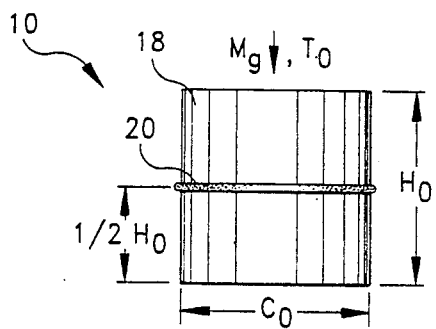
FIG. 3 is another side elevational view of the isolation mount alone at a first-temperature $T_0$.

The sag-compensated vibration isolation mount 10 comprises a viscoelastic body element 18, and a circular band 20 which extends around the body element 18. The visco-elastic body element 18 is preferably formed from a conventional rubber material, although other resilient visco-elastic materials are also suitable. The body element 18 is preferably formed in a cylindrical shape, and it has a first end 22 which is bonded to the motor 14, and an opposite second end 24 which is bonded to a supporting surface 26 (FIG. 2) in the machine. Bonding of the body element 18 to the supporting surface 26 and to the electric motor 12 is accomplished in any suitable manner, such as by epoxy resin. The cylindrical body element 18 has a predetermined height $H_0$ which is measured from the first end 22 thereof to the second end 24 thereof, and a predetermined circumference $C_0$, and a predetermined circumference $C_0$. The body element 18 is effective for supporting the motor 12 above the supporting surface 26 and maintaining the drive shaft 14 of the motor 12 at a predetermined height $D_0$. FIGS. 2 and 3 show the vibration isolation mount 10 under a constant load Mg at a first temperature $T_0$. It is pointed out that temperature $T_0$ represents ambient room temperature, and that the body element 18 does not exhibit any sagging at temperature $T_0$.

The circular band 20 is preferably formed from a shape-memory alloy (SMA) metal, such as Nitinol. A shape-memory alloy metal typically comprises a stoichiometric composition of nickel and titanium that exhibits a dimensional memory when it is heated above a predetermined transition temperature. The SMA band 20 has a predetermined transition temperature $T_1$ which is greater than ambient room temperature $T_0$, and a first length $L_1$ at a temperature below its transition temperature $T_1$. At a temperature below its transition temperature $T_1$, the band 20 can be forcibly lengthened or stretched to a second length $L_2$. The band 20 will maintain this length $L_2$ for an indefinite period so long as the temperature is not elevated above its transition temperature $T_1$. When the temperature of the stretched band 20 is elevated above its transition temperature $T_1$, the band 20 is substantially instantly restored to its original length $L_1$. A shape-memory alloy, such as Nitinol, contracts approximately 4 percent of its length. During contraction, the band 20 exhibits a substantial tensile force. The band 20 extends around the cylindrical body element 18 at a midpoint point between the opposite ends, i.e., $\frac{1}{2}$ of the cylinder height $H_0$. In the preferred embodiment, the stretched length $L_2$ of the band 20 is substantially equal to the circumference $C_0$ of the cylinder. In this manner, the operative or contracted length $L_1$ is slightly smaller than the circumference $C_0$. At a temperature below the transition temperature $T_1$, the resilient nature of the rubber body element 20 normally stretches and maintains the band 20 at its second length $L_2$. However, when the temperature of the band 20 is elevated above its transition temperature $T_1$, the band 20 automatically contracts to its operative length $L_1$ and exerts a radial compressive force on the cylindrical body element 18.

Figure 4:
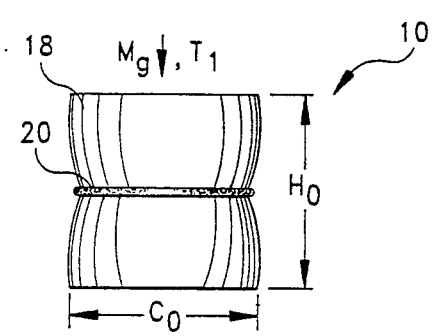
FIG. 4 is similar view thereof at a second temperature $T_1$.

In operation of the isolation mount 10, the body element 18 has a predetermined height $H_0$ and a predetermined circumference $C_0$ at ambient room temperature $T_0$ (FIG. 3). Since the ambient room temperature $T_0$ is lower than the SMA's transition temperature $T_1$, the band 20 is stretched by the body element 18 and maintained at its second length $L_2$. As the motor operates and the temperature rises, the body element 18 loses elastic strength and tends to bulge outwardly and sag under the weight of the motor 12. However, when the temperature rises above the transition temperature $T_1$, the band 20 instantly contracts to its first length $L_1$, and radially compresses the body element 18. (FIG. 4). The radial compression restricts the outward bulging and sagging of the body element 18 and maintains the height of the body element 18 at $H_0$. It is pointed out that a variety of shape-memory alloy metals are available and that each has a different transition temperature. In this regard, the shape-memory alloy band 20 is preferably chosen to have a transition temperature which is approximately equal to the temperature at which the rubber body element 18 begins to exhibit signs of sagging.

Figure 5:
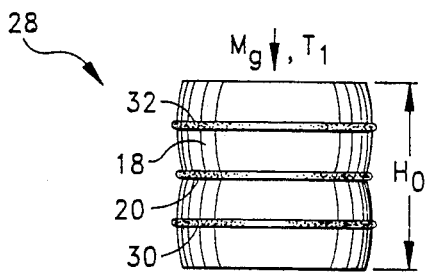
FIG. 5 is an elevational view of a second embodiment of the isolation mount at temperature $T_1$.
Figure 6:
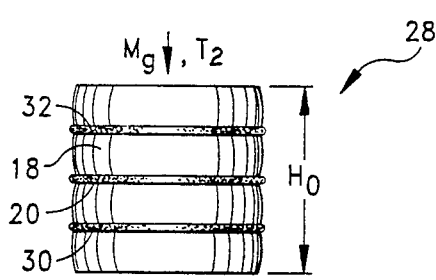
FIG. 6 is similar view of the second embodiment at a third temperature $T_2$.

A second embodiment of the vibration isolation mount is generally indicated at 28 in FIGS. 5 and 6. The second embodiment 28 further comprises second and third shape-memory alloy bands 30 and 32 which respectively encircle the body element 18 at $\frac{1}{4}$ and $\frac{3}{4}$ of height $H_0$. The second and third shape-memory alloy bands 30 and 32 have a transition temperature $T_2$ which is greater than transition temperature $T_1$. The second and third bands 30 and 32 operate in the same manner as the first band 20 wherein they have a first length $L_1$ at a temperature above their transition temperature $T_2$, and at a temperatue below the transition temperature $T_2$ they are stretchable to a second length $L_2$. The second length $L_2$ is substantially equal to circumference $C_0$ of the cylindrical body element, and at temperatures below the transition temperature $T_2$, the body element 18 normally stretches the second and third bands 30 and 32 to their second length $L_2$ (FIG. 5). When the temperature is elevated above the second transition temperature $T_2$, the second and third bands 30 and 32 contract to their shorter operative length $L_1$ to radially compress the body element 18 (FIG. 6). It can therefore be seen that the second and third SMA bands 30 and 32 compensate for further bulging and sagging of the body element 18 as the temperature is further increased.

Figure 7:
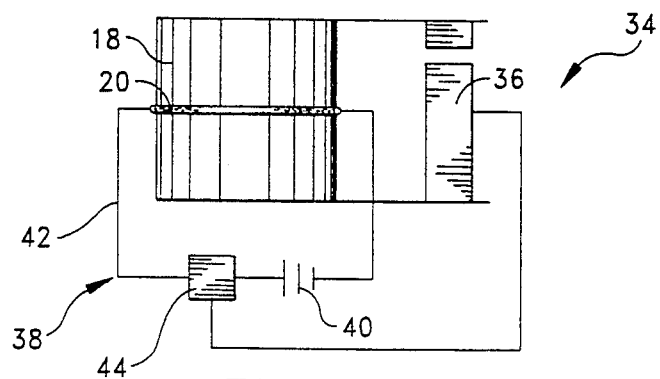
FIG. 7 is an elevational view of a third embodiment of the isolation mount.

A third embodiment of the vibration isolation mount of the instant invention is generally indicated at 34 in FIG. 7. The third embodiment 34 comprises an active sag compensation including a sensor 36 for sensing a height H of the body element 18, and a power circuit 38 for ohmically heating the alloy band 20. The height sensor 36 actively senses the height of the isolation mount 18 as temperature rises and falls. The power circuit 38 comprises a DC power source 40 for generating an electric current, a series circuit 42 for carrying the electric current to the band, and a switch 44 for energizing the circuit 42. When the temperature rises and the body element 18 sags to a point where the sensor 36 is triggered, the sensor 36 sends a signal to the switch 44 to close the circuit 42 to provide electric current to the SMA band 20. The electric current is operative for ohmically heating the band 20 above its temperature $T_1$ thereby causing the band 20 to contract and squeeze the body element 18. When the system is de-energized, the band 20 slowly cools below its transition temperature and thereafter it becomes stretched by the resilient body element back to its second relaxed length $L_2$.

While the embodiments herein described specifically contemplate a vibration isolation mount having a cylindrical body element, it is to be understood that isolation mounts are designed in many different configurations depending on the type of load carried to be carried and the axis of isolation. Isolation mounts are often not circular in configuration, and it is to be understood that the concepts of the instant invention can be applied to the various isolation mount shapes by using standard design practices to constrain the bulging of the viscoelastic body elements using any number of bands, wires, rings or other appropriately designed constraining elements.

Still further it is to be understood that a constriction band having a mechanical adjustment mechanism is also contemplated within the scope of the invention. In this connection, a band is extended around the body element wherein the length thereof is adjusted using hydraulics, piezoelectric materials, linear actuators, rotary screws or other suitable mechanical means for adjusting the length of the band. For example, one specific embodiment of this type could utilize a thermostatic sensor to measure temperature changes or a height sensor to measure sag and a rotary screw to adjust the length the of constriction band. Still further this embodiment could also include a control system which measures gradual temperature changes and then operates the rotary screw to gradually adjust the length of the constriction band as a function of rising temperature or height variation and vice versa.

It is seen therefore that the instant invention provides an isolation mount which simply and effectively compensates for bulging or sagging of the body element at elevated temperatures. The circular band decreases in length when heated above a transition temperature and radially compresses the body element to change the dimensional properties of the body element. In effect, the band squeezes the cylindrical body element so that the height thereof is maintained constant. While the circular band restricts outward bulging of the body element, it has only a minimal effect on the performance of the isolation mount. In addition, it is possible to actively control the height of the vibration isolation mount by means of an active control system (height sensor and power circuit). The system is effective for ohmically heating a shape-memory alloy band above its transition temperature when the height of the body element sags below its desired height $H_0$. Ohmic heating can be achieved using either an AC or DC power source. It is to be understood that when actively controlled, the sag compensated vibration isolation mount can be used to compensate for sag caused by a variety of factors. These factors include, but are not limited to: changes in the mass of the isolated component, changes in acceleration of the machine, and changes in force applied to or by the isolated component (such as torque or thrust). The active control of this invention will be effective for both steady sag producing effects and oscillating (unsteady) effects up to the high frequency limit of the compensating mechanism. For these reasons, the sag-compensated vibration isolation mount of the instant invention is believed to represent a significant advancement in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A vibration isolation mount comprising:
   a visco-elastic body element having opposite first and second ends, a predetermined height and a predetermined perimeter;
   at least one band means extending around said body element intermediate said opposite ends, said band means having a length substantially equal to said predetermined perimeter; and
   means for decreasing the length of said band means responsive to a predetermined temperature increase so as to forcibly compress said body element.

2. In the vibration isolation mount of claim 1, said body element comprising a cylinder.

3. In the vibration isolation mount of claim 1, said body element comprising rubber.

4. In the vibration isolation mount of claim 1, said band means comprising a shape-memory alloy band having a predetermined transition temperature, said band having a first length at a temperature above said transition temperature, said band being stretchable to a second length at a temperature below said transition temperature, said second length being substantially equal to said predetermined perimeter, said body element normally stretching said band to said second length at a temperature below said transition temperature, said band decreasing in length to said first length to forcibly compress said body element when heated to a temperature above said transition temperature.

5. In the vibration isolation mount of claim 1, said band means being positioned at approximately ½ of said predetermined height.

6. The vibration isolation mount of claim 1 further comprising:
   second and third band means extending around said body element intermediate said opposite ends; and
   means for decreasing the length of said second and third band means.

7. In the vibration isolation mount of claim 6:
   said band means comprising a first shape-memory alloy band having a first transition temperature, said band having a first length at a temperature above said transition temperature, said band being stretchable to a second length at a temperature below said transition temperature, said second length being substantially equal to said predetermined perimeter, said body element normally stretching said band to said second length at a temperature below said transition temperature, said band decreasing in length to said first length when heated to a temperature above said transition temperature, and
   said second and third band means comprising second and third shape-memory alloy bands having a second transition temperature greater than said first transition temperature, said second and third bands having a first length at a temperature above said second transition temperature, said second and third bands being stretchable to a second length at a temperature below said second transition temperature, said second length being substantially equal to said predetermined perimeter, said body element normally stretching said second and third bands to said second length at a temperature below said second transition temperature, said second and third bands decreasing in length to said first length to further forcibly compress said body element when heated to a temperature above said second transition temperature.

8. In the vibration isolation mount of claim 7, said first band being located at ½ of said predetermined height, said second and third bands being respectively located at ¼ and ¾ of said predetermined height.

9. The vibration isolation mount of claim 4 further comprising means for sensing a height of said body element, and means for ohmically heating said band when said height is less than said predetermined height.

10. In the vibration isolation mount of claim 9, said means for ohmically heating said band comprising power means for generating an electrical current, circuit means for carrying said electric current to said band, and switch means associated with said sensing means, said sensor means triggering said switch means to energize said circuit when said height is less than said predetermined height.

11. A vibration isolation mount comprising:
a viscoelastic body element having opposite first end and second ends, a predetermined height and a predetermined perimeter; and
a shape-memory alloy band extending around said body element intermediate said first and second ends, said shape-memory alloy band having a predetermined transition temperature, and a first length at a temperature above said transition temperature, said band being stretchable to a second length at a temperature below said transition temperature, said second length being substantially equal to said predetermined perimeter, said body element normally stretching said band to said second length at a temperature below said transition temperature, said band decreasing in length to said first length to forcibly compress said body element when heated to a temperature above said transition temperature.

12. A vibration isolation mount for isolating an object from a supporting surface comprising:
a viscoelastic body element having a first end attached to said object and an opposite second end attached to said supporting surface, said object exerting a constant compressive load on said body element wherein said body element has a predetermined height and a predetermined perimeter at a first temperature, said body element sagging to a height less than said predetermined height and a perimeter greater than said predetermined perimeter when said body element is heated to a temperature above said first temperature;
band means extending around said body element intermediate said opposite ends, said band means having a length substantially equal to said predetermined perimeter; and
means for decreasing the length of said band means when said body element is heated above said first temperature, said band means forcibly compressing said body element and thereby restricting outward bulging of said body element.

13. In the vibration isolation mount of claim 12, said band means comprising a shape-memory alloy band having a predetermined transition temperature which is greater than said first temperature, said band having a first length at a temperature above said transition temperature, said band being stretchable to a second length at a temperature below said transition temperature, said second length being substantially equal to said predetermined perimeter, said body element normally stretching said band to said second length at a temperature below said transition temperature, said band decreasing in length to said first length to forcibly compress said body element when heated to a temperature above said transition temperature.

14. The vibration isolation mount of claim 13 further comprising means for sensing a height of said body element, and means for ohmically heating said band when said height is less than said predetermined height.

15. In the vibration isolation mount of claim 14, said means for ohmically heating said band comprising power means for generating an electrical current, circuit means for carrying said electric current to said band, and switch means associated with said sensing means for energizing said Circuit when said height is less than said predetermined height.

16. The vibration isolation mount of claim 14 further comprising:
second and third band means extending around said body element intermediate said opposite ends; and
means for decreasing the length of said second and third band means so as to further forcibly compress said body element.

* * * * *